Oct. 3, 1961  J. SUNNEN  3,002,284
MEASURING INSTRUMENT
Filed May 21, 1958  3 Sheets-Sheet 1

INVENTOR
JOSEPH SUNNEN
By Gravely, Lieder & Woodruff
ATTORNEYS,

United States Patent Office 3,002,284
Patented Oct. 3, 1961

3,002,284
MEASURING INSTRUMENT
Joseph Sunnen, 400 S. Warson Road, Clayton 5, Mo.
Filed May 21, 1958, Ser. No. 736,787
16 Claims. (Cl. 33—164)

The present invention relates to measuring devices in general and more particularly to a measuring device or size setting fixture which can be adjusted with extremely precise accuracy over a relatively wide range.

So far as known, no satisfactory means have heretofore been devised for accurately setting gaging equipment and particularly gaging equipment for measuring the accuracy of internal surfaces such as the gages disclosed in my patents No. 2,735,188, issued February 21, 1956, No. 2,785,473, issued March 19, 1957 and No. 2,803,886, issued August 27, 1957. In the past such gages were set using means such as calipers, ring gages and other crude devices, none of which is accurate and versatile enough to meet the growing needs of industry and science.

These and other disadvantages of the known means are overcome by the present setting fixture which comprises a frame having spaced end portions joined by a connecting bridge, a coarse adjustment member positioned on one of the end portions including a knob for rotating and axially displacing said member to any desired setting position, a fine adjustment member positioned in the other end portion and axially aligned with the coarse member, said fine member having a knob for rotating and axially displacing said member toward and away from the coarse threaded member, a coarse setting dial for indicating the location of the coarse adjustment member relative to the frame, a fine setting dial for indicating locations of said fine adjustment member, means for locking the coarse and fine threaded members at selected setting locations, and means carried on the frame for supporting the fixture in an operative position.

A principal object of the invention is to provide a gaging fixture that can be quickly and accurately set to any dimension within the range thereof.

Another object is to provide a setting fixture that can be locked at a particular setting, if desired.

Another object is to increase the accuracy and flexibility of gaging instruments and particularly instruments used to measure the accuracy of internal surfaces.

Another object of the invention is to provide a sizing device that can be operated with extremely precise accuracy by persons having little or no instruction.

Another object of the invention is to provide a calibrating or sizing fixture which has general utility as a measuring device and which is also designed to be employed with existing gages.

Another object is to provide a precision size setting fixture with built-in means to compensate for lead screw error.

Another object is to provide a precision setting fixture of rugged construction.

Another object is to provide a precision setting fixture of such construction as to minimize error caused by changes in temperature and other natural changes.

These and other objects and advantages will become apparent after considering the following detailed description of several embodiments of the invention in conjunction with the accompanying drawings:

Referring now the drawings by reference numbers, number 10 (FIGS. 1, 2 and 3) refers to a setting fixture constructed according to the teachings of the present invention. In the drawings, number 12 indicates the fixture frame which has an upper bridging portion 14, a lower bridging portion 16, a left end support 18, and a right end support 20.

Figure 3:
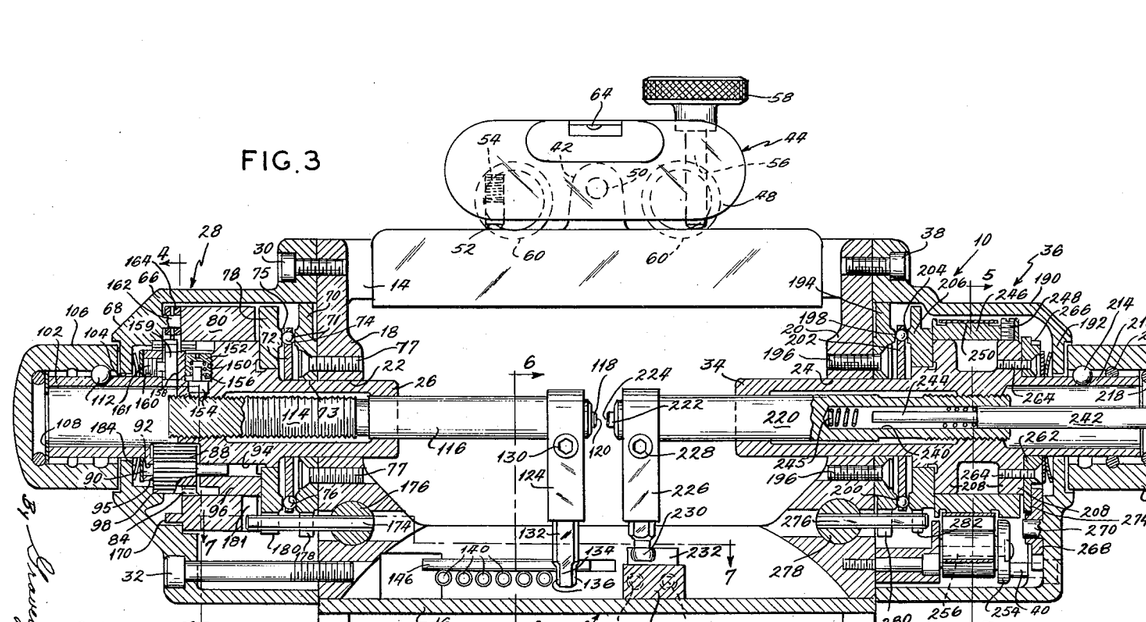
FIG. 3 is a longitudinal sectional elevational view of the setting fixture per se taken along the center line of the fixture in FIG. 2.

The left and right end supports 18 and 20 have aligned bores 22 and 24 respectively therethrough (FIG. 3). The bore 22 receives a tubular sleeve 26 which is part of a coarse adjustment device 28, and the device 28 is attached to the end support 18 by screws 30 and 32. The bore 24 receives another tubular sleeve 34 which is part of a fine adjustment device 36. The device 36 is attached to the end support 20 by screws 38 and 40 such that the sleeve 34 extends through the bore 24 toward the left support 18. The details of construction of the coarse and fine adjustment devices 28 and 36 will be described in detail hereinafter.

The upper bridging portion 14 has an upwardly extending projection 42 midway of its length. A trolley assembly 44 is pivotally attached to the projection 42 and is used to suspend and support the fixture 10 on a gage, such as the gage 46 shown in FIGS. 1 and 2. The trolley assembly 44 has a housing 48 which is pivotally connected to the projection 42 by a pin 50. The housing carries a downwardly extending pin 52 that is pressed by spring 54 on the upper bridge 14 at one side of the housing pivot, and in opposition to an adjustable thrust member 56 which has a knurled knob 58 at its upper end. By rotating the knob 58 when the fixture 10 is mounted on the gage 46, the fixture can be properly orientated in relationship to the gage as will be shown hereinafter.

The trolley assembly 44 has two flanged freely rotating wheels 60 (FIGS. 2 and 3) which support the fixture 10 on the upper edge of a gage plate 62 (FIGS. 1 and 2) on the gage 46 and permit free endwise movement of the fixture 10 thereon. When the fixture 10 is mounted on the gage plate 62 the knurled knob 58 is used to orientate the fixture and a bubble gage 64 located on the trolley assembly 44 indicates when the upper edge of the plate 62 is level. It is desirable to have the upper edge of the gage plate 62 as level as possible to minimize or eliminate any tendency of the fixture 10 to roll longitudinally thereon. Any such tendency has the effect of throwing the gage setting off.

Coarse adjustment device

Turning now to a detailed description of the coarse adjustment device 28, it is seen (FIG. 3) that the device 28 is encased in a housing 66. The housing 66 is tubular in shape being fully open at the end adjacent to the support 18 and being partially enclosed at the other end by an annular flange 68. An annular disc 70 with an annular bearing race 71 thereon is positioned closing the open end of the housing 66. The disc 70 is fastened to the support 18 by screws 77 and has an opening 73 which rotatably receives the sleeve 26. Another annular bearing disc 72 is positioned adjacent to the disc 70 in the housing 66 and carries a ring of bearing rollers 74 in suitable openings 76 therein. The rollers 74 engage the race 71 on one side and engage a similar race 75 on the opposite sides thereof on another annular bearing disc 78. The disc 78 is fixedly mounted on the sleeve 26.

An annular coarse setting indicator member 80 is positioned adjacent to the disc 78 in the housing 66. The member 80 is rotatable in the housing 66 and the outer surface thereof has coarse setting indicia inscribed thereon. The indicia are visible through a window opening 82 (FIG. 1) in the housing 66, and the margin of the window opening has a fixed scribe line 81 that cooperates with the indicia on the member 80 to enable accurately setting the coarse adjustment.

The indicator member 80 has internal gear teeth 84 formed on the inner surface at the left end thereof. The teeth 84 are cooperatively meshed with teeth on a pinion gear 88, and the pinion gear 88 is rotatably mounted on a pinion shaft 90. The shaft 90 extends between aligned bores 92 and 94 formed in enlarged portions 95 and 96 respectively of the tubular sleeve 26, and a groove for said gear 88 is formed between said enlarged portions 95 and 96.

The right end of the pinion gear 88, as stated, is meshed with the internal teeth 84 on the member 80 and the left end of the pinion gear 88 is meshed with internal teeth 98 formed on the flanged portion 68 of the housing 66. Since the housing teeth 98 are fixed, the pinion gear 88 rolls, in planetary fashion, around the inside of the housing whenever the position of the coarse adjustment device 28 is changed.

The tubular sleeve 26 also has an integral leftwardly extending sleeve portion 102 which extends from the left end of the housing 66. The sleeve portion 102 extends through a bore 104 in the flanged housing portion 68 and carries a knob 106 which is sealed to the sleeve 102 by an annular resilient seal 108 and is prevented from moving relative to the sleeve 102 by one or more balls 112 positioned as shown in FIG. 3.

A portion of the internal surface of the sleeve 26 is threaded (with relatively fine threads) and cooperatively receives a coarse adjusting screw 114. The screw 114 is positioned inside the sleeves 26 and 102 and is smooth surfaced over its right end portion 116 and extends outwardly from the sleeve 26. The right end of the screw 114 is hardened or is provided with a hardened insert, such as insert 118, which is tapered to a small flat end surface 120. The insert 118 is preferably formed of tungsten carbide or some other hard material which resists wear.

It will now be observed that when the knob 106 on the left end of the fixture 10 is rotated, the sleeve 26 (and 102 which is integral therewith) rotates and the pinion gear 88 rolls around the gear 98 on the inside of the housing. In so doing the screw 114, being prevented from rotating by means to be described, threads inwardly or outwardly from the sleeve 26 changing its position longitudinally therein. Furthermore, the indicator member 80 also rotates because it is rotatably mounted on the enlarged central portion 96 of the sleeve 26 and is geared to the pinion gear 88. The gear 84 on the member 80 in the embodiment shown has one more tooth than the gear 98 on the housing 66. Therefore, when the pinion gear 88 has made one revolution in the housing 66 the indicator member 80 will have moved a small distance approximately equal to 1/60 of its circumference. In one revolution of the knob 106 and sleeve 26, the screw 114 will also have moved axially a distance equal to the width of one thread. Therefore, to move the screw 114 between adjacent coarse dial settings the knob 106 must be turned through several revolutions depending on the pitch of the threads and the distance between dial settings.

The indicator member 80 in the construction shown, has dial settings corresponding to setting positions of .1, .3, .5, .7, .9, 1.1, and 1.3 inches measured from a zero or fully extended position of the screw 114. In any of the seven setting positions, the position of the screw 114 is fixed relative to the frame, and the screw 114 can be locked as will be shown hereinafter.

A compensating arm 124 is mounted on the smooth portion 116 of the screw 114 adjacent to the free end thereof. The arm 124 extends downwardly from the screw 114 into a groove 126 in the lower bridging portion 16 (FIGS. 6 and 7) and is rounded at the top and has a bore 128 therethrough that receives the screw 114. Below the bore 128, the arm 124 is split (FIG. 6) and a threaded connector 130 extends through the arm 124 and is tightened to clamp the arm 124 on the screw 114. A lower extension 132 of the arm 124, extends downwardly into the groove 126 and has flat front and rear faces 134 and beveled corners 136.

Figures 6, 7:
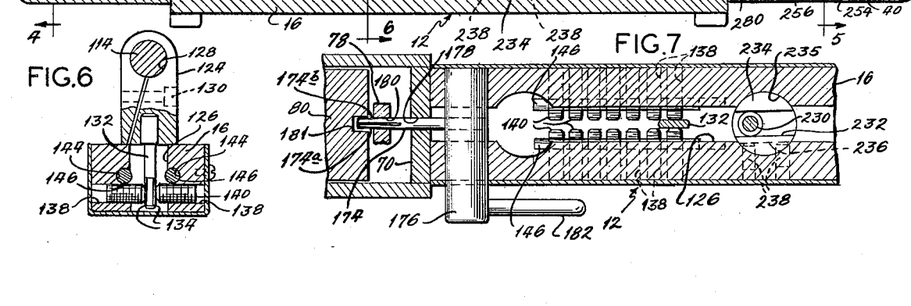
FIG. 6 is an enlarged cross-sectional view taken on line 6—6 of FIG. 3.
FIG. 7 is an enlarged cross-sectional view taken on line 7—7 of FIG. 3.

The walls of the lower bridging portion 16 adjacent to the groove 126 are provided with rows of spaced threaded bores 138 (FIG. 6). The bores 138 extend through the bridge 16 on both sides of the groove 126 and threadedly receive set screws 140. The set screws 140 are rounded on the ends adjacent to the groove 126 and are adjustable in the bores 138. A channel 144 is formed in both sides of the groove 126 adjacent to the bores 138 and an elongated plastic strip 146 is positioned in each channel 144 to engage the threaded surfaces of the associated set screws 140 and prevent accidental relative movement thereof once the screws have been factory adjusted. The set screws 140 are arranged in opposed pairs along the groove 126 and each pair is adjusted to slidably pass the lower extension 132 of the arm 124. When the extension 132 is between two opposed screws 140 there should be no play or free motion in the arm 124 such as would tend to rotate the portion 116 and produce error in the setting. The error in screw 114 may be very small, but the adjustability of the pairs of opposite set screws 140 will allow correction at each set screw location.

In the particular embodiment of the invention shown, are positions for seven pairs of opposed set screws 140, one position being provided for each setting of the coarse adjustment device 28. By adjusting the coarse adjusting device 28 (as will be shown) so that the lower arm extension 132 is in any one of the seven positions, the position of the coarse setting screw 114 is fixed relative to the tubular sleeve 26 and the support 18. The fine adjustment device 36 is then adjustable over a range approximately equal to the difference between adjacent coarse settings. In this way the distance between the end face 120 on the screw 114 and a similar end face 224 on a fine adjusting screw (to be described later) is determined.

Before leaving the coarse adjusting device 28 certain other features should be noted. For example, a threaded radial passage 150 extends through the enlarged portion 96 of the sleeve 26 (FIG. 3) and receives a hollow cap screw 152 which encloses a plunger 154 (preferably formed of resilient material) urged by a spring 156 out of the cap screw 152 and against the threads on the screw 114. The plunger 154 is added to restrict free movement or play between the screw 114 and the sleeve 26.

Another radial passage 158 (FIGS. 3 and 4) is formed in the portion 96 adjacent to the passage 150 and a cross-shaped member 159 is positioned therein. The member 159 (shown better in FIG. 4) has an upper portion 159a, and two laterally extending arms 159b and 159c. A threaded passage 160 communicates with the passage 158 and receives a set screw 161 which locks the member 159 in the passage 158.

Figure 4:
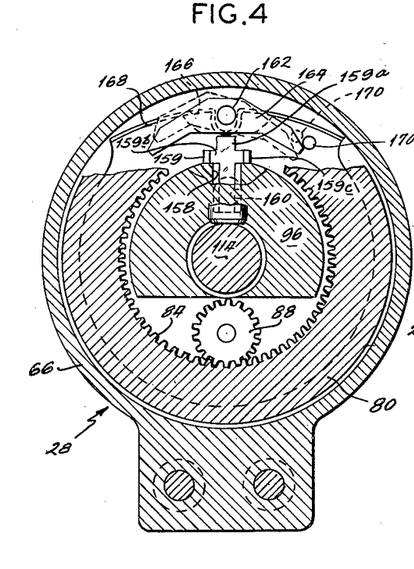
FIG. 4 is an enlarged cross-sectional elevational view on line 4—4 of FIG. 3.

A stud 162 is formed on the flanged portion 68 of the housing 66 near the top and pivotally carries a double acting ratchet member or pawl 164. The pawl 164 has a longitudinal slot 166 formed therein and a wire spring 168 is positioned in the slot 166 to retain the pawl 164 in an inoperative position as shown in solid outline in FIG. 4. Another stud 170 is carried by the dial member 80 and moves therewith in a circular arc passing through the stud 162. When the indicator member 80 is rotated in either direction almost to the end of its travel, the stud 170 engages the corresponding head of the pawl 164 and further movement thereof cams the engaged end of the pawl 164 inwardly. On a succeeding revolution of the sleeve 26 (and cross member 159) the upper portion 159a of the cross member 159 catches on the pawl 164 and prevents further movement in the same direction. In FIG. 4 the stud 170 is shown in solid line to indicate the point at which it first begins to engage the pawl 164 and is shown in dotted lines to show the cammed in position of the pawl 164.

Provision is also made on the coarse adjustment device 28 for locking the device in any of its seven setting positions. The locking mechanism (FIG. 3) consists of a locking arm 174 which is split at its left end (FIG. 7) into unequal portions 174a and 174b, and the arm 174 is pivotally mounted on the frame on a stud 176. The arm 174 is movable radially in a slot 178 in the lower edge of the disc 70 and is also movable into cooperative engagement in a lone slot 180 formed in the edge of the disc 78. Since the portion 174b on the locking arm 174 is thicker than portion 174a, and since the combined width of the portions 174a and 174b is slightly greater than the width of the slot 180, the portion 174b presses against one side of the slot 180 during a locking operation and causes the portion 174a to be yieldably deflected slightly as it enters the slot 180. In this way backlash is eliminated in the rotatable members. When the arm 174 is manually swung counterclockwise, it will clear the edge of disc 78, thereby permitting the disc 78 and the sleeves 26 and 102 to rotate. The end of the arm portions 174a and 174b also cooperate with slots 181 in the indicator member 80. Positions for seven slots 181 are provided in member 80 corresponding to the seven setting positions. In order for the slot 180 to line up with the slots 181, the disc 78 must make a full number of revolutions while the member 80 rotates only a distance equal to the distance between adjacent slots 181. When the arm 174 is moved clockwise into one of the seven slots 181, the disc 78, the member 80, and the associated rotatable elements are prevented from moving. The locked position is shown in FIG. 3. The pivot stud 176 extends out the front of the fixture frame and has a handle 182 (FIG. 1) which operates it.

It should also be noted that a spring 184 is positioned between the housing flange 68 and the enlarged portion 95 of the sleeve member 26. The spring 184 urges the sleeve 26 (and disc 78) rightwardly in the housing 66 thereby loading the bearings 74 and eliminating any free axial movement between the various members.

*Fine adjustment device*

The fine adjustment device 36 is mounted on the right frame support 20 and is enclosed in a housing 190. The housing 190 is tubular being open on the left end and partly closed on the right end by a flanged portion 192. The housing 190 is attached to the frame support 20 by the screws 38 and 40 and the left end thereof is closed by an annular disc 194 that is attached to the support 20 by screws 196. The disc 194 has an annular bearing race 198 which cooperates with a plurality of bearing rollers 200 mounted in openings in an annular member 202. The opposite sides of the rollers 200 engage another annular race 204 on annular member 206 and the member 206 is fixedly mounted on the tubular sleeve 34 and rotates therewith.

The sleeve 34 extends through the housing 190 and projects from both ends thereof. The central portion of the sleeve 34 is enlarged at 208 and the right end portion 210 carries a knob 212 which is fastened thereto by one or more ball members 214. Annular seals 216 and 218 are also provided to cushion and seal the knob 212 on the sleeve 210. Part of the inner surface of the sleeve member 34 is threaded and cooperates with similar threads on a fine adjusting screw 220. The screw 220 extends from the end of the sleeve 34 toward the screw 114 and the inner end thereof is hardened or is provided with a hardened insert, such as insert 222, which has a small flat end surface 224 thereon. The end surface 224 is aligned axially with and moves toward and away from the end surface 120 on the coarse adjustment screw 114.

A compensating arm 226 is attached to the inner free end of the screw 220 and is split like the arm 124, and clamped to the screw 220 by a threaded connector 228. The lower end of the arm 226 is reduced in size and has a rounded portion 230 adapted to move in a groove 232 in a block member 234 (FIGS. 3 and 7). The member 234 is rotatively positioned in a socket 235 in the lower bridging portion 16 and has one flat surface 236 thereon. Two adjustment screws 238 are mounted in the bridging portion 16 and operate against the flat surface 236 to position the member 234 in a desired turned position such that the groove 232 is aligned so as to minimize or eliminate rotary play or lateral looseness in the position of the fine lead screw 220. The member 234 is usually adjusted at the factory so that the axis of the groove 232 makes the proper angle relative to the bridging member 16. Practically all lead screw error can be eliminated by proper adjustment of the block 234.

A bore 240 is formed in the right end of the screw 220 and a piston 242 is slidably positioned therein. The piston 242 has a reduced diameter portion 244 inside the bore 240 and a spring 245 is positioned on the portion 244 and operates against the seat of the bore 240 to move the piston 242 rightwardly against the knob 212. In this way, leftward pressure is applied to the screw 220 eliminating any axial play or free axial motion of the screw 220 in the sleeve 34.

A large annular spool 246 is fixedly mounted on the enlarged central portion 208 of the sleeve 34. The spool 246 is locked in position on the portion 208 by one or more set screws such as screw 248 (FIG. 3) and the outer surface of the spool 246 is grooved to receive a tape 250. The tape 250 is formed of flat springlike material having a normal condition curled into a relatively small coil. One end of the tape 250 is fastened to the spool 246 by suitable means, such as screws (not shown) and the opposite end is fastened to a small spool 254 rotatively mounted in the housing 190 below the larger spool 246. The small spool 254 is mounted on a shaft 256 attached to the frame 12.

Figure 1:
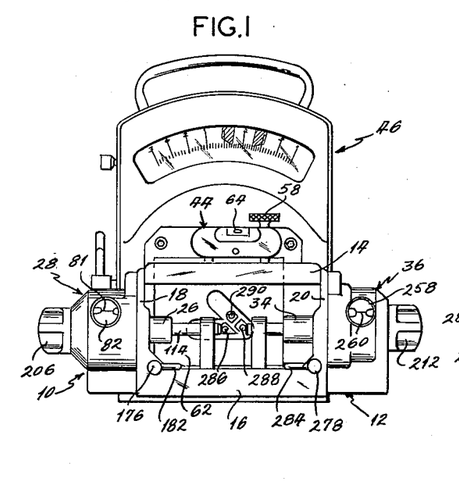
FIG. 1 is a front elevational view showing a preferred form of the present setting fixture, the fixture being shown mounted on a known gaging instrument.

The outer surface of the tape 250 is inscribed with a fine scale which covers the full range between adjacent coarse settings. When the knob 212 is rotated the large spool 246 is rotated therewith and winds or unwinds the tape 250, moving the scale on the tape 250 past a window opening 258 (FIG. 1). The window opening has a hair line 260 visible therein which indicates the tape reading. When the tape 250 is wound onto the large spool 246 it is stressed in opposition to its normal condition and this stressed condition causes the tape 250 to rewind itself onto the small spool 254 when the tape 250 is unwound from the large spool 246.

Figure 5:
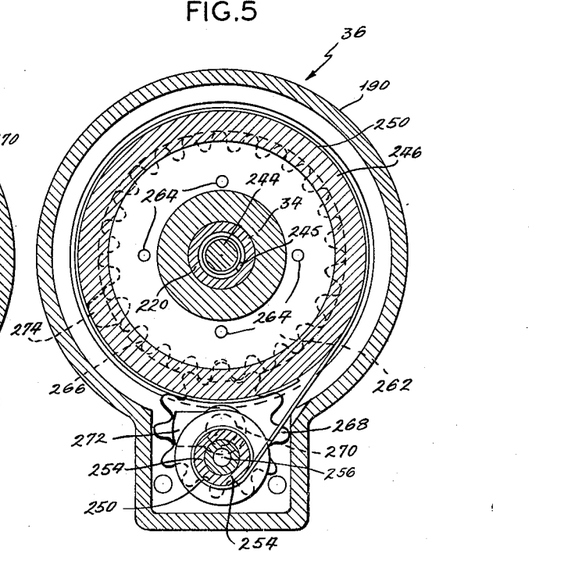
FIG. 5 is an enlarged cross-sectional elevational view on line 5—5 of FIG. 3.

The fine adjustment device 36 is also provided with means to limit travel of the rotatable members in both directions. This is done primarily to prevent jamming of the mechanism and to prevent the tape from coming loose. The stop means on the fine adjusting device 36 consist of a gear member 262 attached to the right side of the enlarged central portion 208 of the tubular sleeve 34. The gear 262 is attached to the portion 208 by screws 264 and has teeth 266 formed around a reduced diameter right portion thereof. A pinion gear 268 engages the teeth of the gear 262 and is rotatably mounted on a stud 270 on the flanged portion 192 of the housing 190. The left side of the gear 268 carries a sidewise projecting element 272 (FIG. 5) which rotates with the gear. The element 272 is timed and formed to engage another projecting portion 274 on the gear 262 whenever the gears 262 and 268 are moved to a predetermined relative position. The cycle of engagement of the projections is timed to take place about every eighth revolution of the gear 262 so that the knob 212 can be rotated through approximately eight revolutions of movement. On the in-between revolutions of the gears 262 and 268, the projections 272 and 274 are positioned and located to by-pass one onther. When portions 272 and 274 do engage, however, they prevent further rotation of the knob 212.

The fine adjustment device 26 is also provided with locking means for retaining the setting positions. The locking means on the fine adjustment device 36 are similar to the locking means on the coarse adjustment device 28 and consist of a locking arm 276, split at the end thereof to eliminate backlash, a pivot stud 278 for the arm 276, a groove 280 for the arm 276 in the disc 194, and a plurality of suitably spaced notches or grooves 282 formed in the edge of the disc 206 at locations corresponding to the major fine adjustment setting positions. A handle 284 (FIG. 1) is attached to the stud 278 for operating the locking means and moving the arm 276 between the locked and unlocked positions. The fine adjustment device 36 must be at a major adjustment position before the grooves 280 and 282 line up permitting the setting to be locked.

Operation

Figure 2:
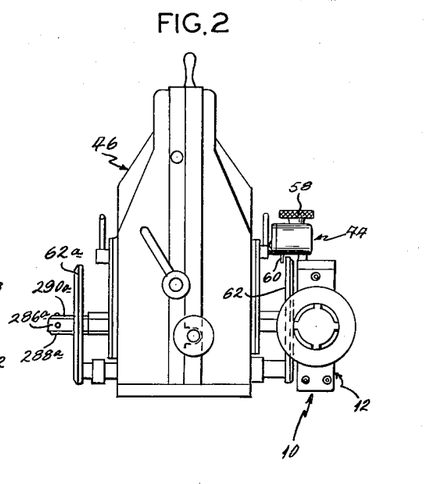
FIG. 2 is an end elevational view of the fixture and gaging instrument of FIG. 1.

The fixture 10 is specifically designed to be used for accurately setting gages such as the gage 46 in FIGS. 1 and 2, but it also has more generalized applications as a caliper device and as an accurate measuring instrument.

When used to set a dimension in the gage 46, the trolley assembly 44 is positioned on the gage plate 62 and the instruments are oriented as previously described. If the upper edge of the gage plate 62 is not level the fixture 10 may tend to roll slightly toward the lower end and this tendency should be eliminated, if possible. Before the fixture can be placed on the plate 62, the coarse and fine screws 114 and 220 must be spaced to receive gage fingers 286 and 288 therebetween (FIGS. 1 and 2). The fingers 286 and 288 and a third finger 290 extend forwardly on the gage 46 through a suitable opening in the gage plate 62. The spacing of the fingers 286, 288, and 290, is adjusted by means on the gage 46 to correspond to the setting of the fixture 10. This is done by moving the fingers 286 and 288 apart until they just engage the spaced surfaces 120 and 224 on the screws 114 and 220 respectively. The construction and operation of the fingers form no part of this invention, but for a clear understanding of the fingers reference should be made to my above cited patents. A similar gage plate 62a and a similar but larger set of fingers 286a, 288a, and 290a extend from the rear of the gage 46 and are used to gage the accuracy of larger diameter internal surfaces.

In order to set the spacing of the fingers 286 and 288, to a particular measurement, the coarse and fine adjustment devices are set to the particular adjustment required, the coarse and fine readings being additive, the fixture 10 is then placed on the gage plate 62 of gage 46, and finally the fingers 286 and 288 of the gage 46 are adjusted so that they just make contact with the hardened surfaces 120 and 224 on the adjacent ends of the screws 114 and 220 respectively. When adjusted the fixture is removed and the gage 46 is used for its intended purpose. Obviously, any setting within the range of the fixture and gage can be accurately set.

As an example, assume it is desired to adjust the gage fingers 286 and 288 on gage 46 (FIG. 1) to measure the accuracy of an internally honed surface having a diameter of .863 inch. To accomplish this, the coarse adjustment device 28 is unlocked and the knob 106 is rotated to a position in which the coarse dial member 80 moves to bring its indicia to the viewing opening and reads .700 inch. The coarse device 28 is then again locked. Next, the fine adjustment device 26 is unlocked and the knob 212 is rotated to move the tape 250 so that the indicia in the viewing opening 258 reads .163 inch. The device is then locked. The fixture is now ready to be positioned on the gage plate 62 and leveled, if necessary. The leveling is important as it avoids having the lateral rolling movement of the fixture impose its weight upon the measuring surfaces 120 and 224 of the screws. Before placing the fixture on the plate 62, however, the gage fingers 286 and 288 should be adjusted to a smaller diameter than .863 so that they can be positioned in the measuring gap between the screws 114 and 220. After the fixture 10 is mounted on the gage plate 62 and leveled, the gage 46 is adjusted so that the fingers 286 and 288 just make contact with the surfaces 120 and 224. Thus, the fixture will very accurately set the fingers of the gage to the desired size to be controlled by the gage.

Modified construction

Figure 8:
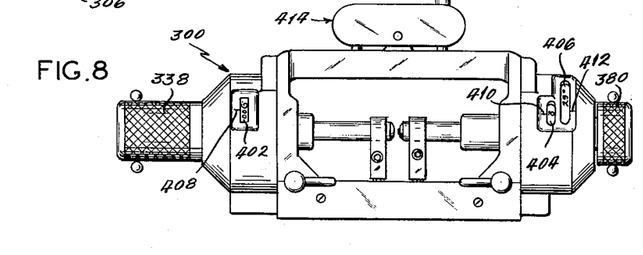
FIG. 8 is a front elevational view showing a modified form of the setting fixture.
Figure 9:
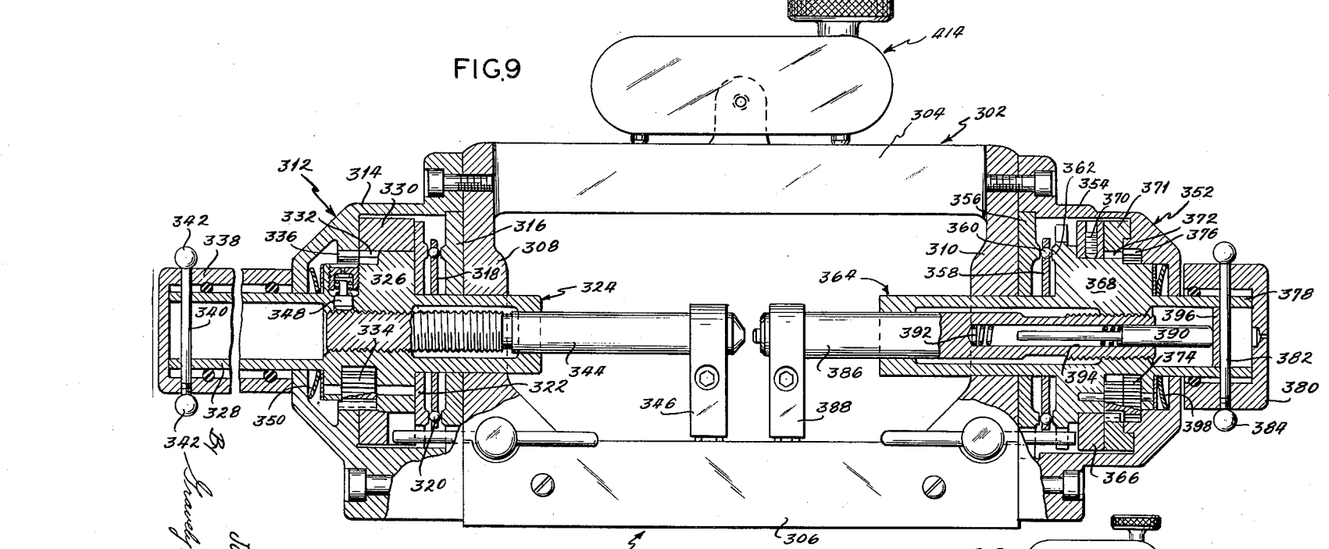
FIG. 9 is a longitudinal sectional elevational view taken along the center line of the modified fixture of FIG. 8.

A modified form 300 of the fixture 10 is shown in FIGS. 8 and 9. In the modified construction 300 the frame 302 is similar to frame 12, being provided with an upper bridge 304, a lower bridge 306, a left support 308 and a right support 310.

A coarse adjustment device 312 is attached to the support 308 and has a housing 314, in which are positioned disc 316 which has a bearing race thereon, bearing disc 318 which carries a plurality of bearing rollers 320, another bearing disc 322, and a tubular sleeve member 324 which has an enlarged center portion 326 and a left end portion 328. An annular dial member 330 is rotatably mounted on the portion 326 and has an internal gear 332 at its left side which engages a pinion gear 334. The left end of the pinion gear 334 engages gear teeth 336 formed on the housing 314. A knob 338 is attached to the sleeve portion 328 by a shaft 340 with ball portions 342 threaded on the ends thereof. A different number of gear teeth are formed on the gears 332 and 336 and this difference causes the dial 330 to move slowly when the knob 338 is rotated.

A screw 344 is threadedly positioned in the sleeve 324 and extends outwardly from the right end thereof having a compensating arm 346 attached thereto. The compensating arm 346 and associated mechanism is similar to the arm 124 and associated mechanism in fixture 10 and will not again be described. Likewise a plunger 348, similar to plunger 154 in fixture 10, is provided to eliminate play in the screw 344; a spring 350, similar to spring 184, is provided to eliminate free axial movement between the rotatable members and the housing 314; and locking means are provided for locking the coarse adjustment device 312 similar to the locking means previously described.

The operation of the modified coarse adjustment device 312 is similar to the operation of the coarse adjustment device 28.

A modified form of the fine adjustment device 36 is shown at 352 on the right frame support 310 and consists of a housing 354, a disc 356 having a bearing race thereon, a bearing disc 358 with roller bearings 360 therein, and another race member 362 which is formed integral with tubular sleeve 364. An annular dial 366 is carried by an enlarged portion 368 of the sleeve 364 and is fixedly attached thereto by set screw 370. Another annular dial member 371 is rotatably mounted on the potrion 368 and has internal gear teeth 372 formed on the right end thereof which cooperate with a pinion gear 374 carried in a notch in the enlarged portion 368. The pinion 374 also cooperates with gear teeth 376 formed on the housing 354.

The right end portion 378 of the sleeve 364 extends from the right end of the housing 354 and carries a knob 380 which is fastened thereto by a shaft 382 with balls 384 threadedly conencted to the ends thereof.

An adjusting screw 386 is threadedly positioned in the sleeve 364 and extends leftwardly therefrom. A compensating arm 388, similar to compensating arm 226 on fixture 10, is attached to the screw 386 and is constructed and operates in the same manner as arm 226. Likewise a plunger 390 and spring 392 are positioned in a bore 394 in the right end of the screw 386 and the plunger 390 engages a circular disc 396 which abuts the shaft 382 and applies leftward pressure on the screw 386. A spring 398 is also positioned between the housing 354 and the rotating members to eliminate any free axial movement therebetween.

Locking means for retaining a setting on the fine adustment device 352 are provided and are similar to the locking means provided on the fine adjustment device 36 of fixture 10. It is therefore not deemed necessary to describe the locking means again.

Opening 402 and openings 404 and 406 are also provided in the housings 314 and 354 respectively (FIG. 8) for reading the indicia on the parts 330, and 366 and 371. The single opening 402 has an external fixed line 408 associated therewith and is provided for reading the coarse settings which appear therethrough on the movable dial member 330; and the two adjacent openings 404 and 406 have associated fixed lines 410 and 412, respectively, for reading the fine setting which appear therethrough on members 366 and 371. The opening 404 frames the indicia for very small changes in the fine setting which are marked on the member 366 and the opening 406 frames the indicia for relatively larger changes in the fine setting indicated by markings on the surface of member 371.

A trolley assembly 414, similar to trolley assembly 44 on fixture 10, is mounted on the upper bridge member 304. Its operation is also similar to the operation of the assembly 44.

Operation of the modified fixture 300 is similar to the operation of the fixture 10 and will not again be described.

Thus it is apparent that there has been shown and described herein a setting fixture of a highly precise nature which fulfills all of the objects and advantages sought therefor. The present fixture, which is embodied in a framework having spaced but relatively movable and accurately positioned members, one of which provides a coarse setting adjustment and the other a fine setting adjustment, involves a novel concept in precision measuring instruments heretofore unknown in the art.

Obviously many modifications, alterations and changes in the present devices will now be understood and appreciated by those skilled in the art. All such modifications, alterations and changes which do not depart from the spirit and scope of the invention are deemed to be covered by this invention which is limited only by the claims which follow.

What is claimed is:

1. A measuring instrument for adjusting the setting of a measurement testing gage comprising a frame having first and second spaced supports and a bridge member connected therebetween, means on the frame for supporting the instrument in an operative position on a measurement testing gage, said means including two spaced rollers rotatively mounted on the instrument and adapted to be positioned on said gage to make a substantially frictionless connection therewith, a coarse adjustment device mounted on the first support, a fine adjustment device mounted on the second support, said coarse and said fine adjustment devices having aligned relatively movable threaded members having opposed measurement defining surfaces thereon, means preventing rotation thereof, and rotating means cooperating with said threaded members for moving said measurement defining surfaces toward and away from each other, said rotating means on the coarse adjusting device have a coarse reading dial associated therewith which usually indicates the position of the associated measurement defining surface, and the rotating member on the fine adjustment device having a fine reading dial associated therewith which usually indicates the position of the surface associated therewith.

2. An instrument for measuring distance comprising a frame having first and second spaced supports connected by a bridge member, an adjusting device mounted on said first support, said device including cooperating relatively movable male and female threaded members one member of which is rotatively mounted on said first support, the other member having a sliding connection to the bridge member and moving in a direction toward and away from said second support in response to rotation of said one member, said rotatively mounted threaded member having indicator means thereon calibrated with said first support to indicate the positional relationship of said threaded members in terms of the distance of said other threaded member from the second support, said sliding connection between said other member and said bridge member including an arm attached to said other member and a groove in said bridge member in which said arm is slidably positioned, said groove having opposed surfaces which are positioned to angularly displace said arm and said other member to adjust the axial position of said other member and thereby compensate for imperfections in the threaded connection between the male and female members.

3. A setting fixture for size setting gaging instruments comprising a frame having a coarse and a fine adjusting device mounted thereon in opposing spaced relation; said coarse adjusting device having an axially movable member with an outwardly extending arm attached thereto, a groove in the frame slidably receiving said arm, a rotatable member mounted on the frame and threadedly connected to the axially movable member for axially moving said member in response to rotation thereof whereby said arm moves in the groove, said groove having opposed arm engaging surfaces which angularly displace said arm and said axially movable member during axial movement thereof to adjust the position of said axial movable member to compensate for imperfections in the threaded connection between the axially movable member and associated rotatable member, and means associated with said rotatable member for indicating the position of the rotatable member in terms of the position of the axially movable member; said fine adjusting device having an axially movable member slidably connected to the frame and aligned with the axially movable member on the coarse adjusting device, a rotatable member mounted on the frame and threadedly connected to the axially movable member for axially moving said member in response to rotation thereof, and means associated with said last named rotatable member for indicating the position of the rotatable member in terms of the position of the associated axially movable member; the sum of the indications of the coarse and fine adjustment devices being equal to the distance between the coarse and fine axially movable members.

4. An instrument for measuring distance comprising a frame having first and second spaced supports and a bridge member connected therebetween; a coarse adjusting device mounted on the first support including cooperatively engaged relatively movable male and female threaded members, one of said members being rotatively mounted on said first support and the other of said members having a sliding connection to the bridge member being movable therealong in a direction toward and away from the second frame support in response to corresponding rotation of said one rotatable member, said sliding connection including an arm attached to the other of said members and a track for said arm on said frame, said track including adjustable arm engaging means for angularly displacing said arm as said arm slides therealong to compensate for imperfections in the threaded connection between the male and female members, means for rotating said one rotatable member, and coarse indicator means on said one rotatable member associated with said first support for indicating the positional relationship between said male and female threaded members; and a fine adjusting device mounted on said second support, said device including cooperatively engaged and relatively movable male and female threaded members, one of said members being rotatively mounted on said second support and the other of said members having a sliding connection to the bridge member so as to move in a direction toward and away from said other coarse movable member in response to rotation of said associated one of said threaded members, means for rotating said rotatable member on said second support, and fine indicator means on said one member associated with said second support for indicating the positional relationship between the male and female threaded members associated therewith, the combined readings of said coarse and fine indicator means being proportional to the distance between the said other coarse and said other fine threaded members.

5. In a precision instrument for setting gaging fingers on a measurement testing gage, a pair of members relatively axially movably related and having cooperating measurement defining surfaces thereon, first means operatively connected to one of said members to move the same independently of the other of said members and adjust the spacing between said measurement surfaces on said pair of members, and error compensating means operatively connected to said one of said members to retain the same in fixed predetermined positions of adjustment and remove slack in said first means, said last named means including a slotted member carried on said first means and a pivotal pin mounted adjacent to said slotted member, said pin having a bifurcated end formed by unequal sized spaced portions having a combined unstressed outside dimension slightly greater than the width of the slots in said slotted member, the smaller of said unequal sized members yielding when said bifurcated end is moved into a slot in the slotted member.

6. In a precision instrument for setting gaging fingers on a measurement testing gage, a pair of members relatively axially movably related and having cooperating measurement defining surfaces thereon, first rotatable means threadedly connected to one of said members to move the same axially independently of the other of said members and adjust the spacing between said measurement surfaces on said pair of members during rotation thereof, and error compensating means including an arm connected to the axially movable member and a track in which said arm moves during movement of said member, said track having spaced arm engaging surfaces which guide said arm during axial movement of said axially movable member, said arm engaging surfaces rotatably adjusting the position of the arm and of the associated axially movable member during movement thereof so as to position the measurement defining surface to compensate for imperfections in the threaded connection between the first rotatable means and associated axially movable member.

7. In a precision instrument for setting gaging fingers on a measurement testing gage, a pair of lead screws relatively axially movably related and having opposed measurement defining surfaces thereon, first rotatable means being threadedly connected to one of said lead screws to move the same independently of the other of said lead screws and adjust the spacing between said measurement surfaces on said pair of lead screws, lead screw error compensating means operatively connected to said one of said lead screws to retain the same in a position of adjustment, said lead screw error compensating means including an arm carried by said one of said lead screws and a member with a track formed therein in which said arm moves, the track in said member being adjustable to angularly shift the position of the arm and the lead screw during movement thereof and thereby to position the associated measurement defining surface in predetermined setting positions so as to compensate for imperfections in the threadedly connected portion of the lead screw, and a graduated scale operatively connected to said one of said lead screws to indicate the distance between said measurement defining surfaces.

8. In a precision instrument for setting gaging fingers on a measurement testing gage, a pair of members relatively axially movably related and having cooperating measurement defining surfaces thereon, first means operatively connected to said one of said members to move the same independently of the other of said members and adjust the spacing between said measurement surfaces on said pair of members, and means for mounting the instrument on a measurement testing gage, said last named means including a roller assembly having a pair of spaced rollers which are adapted to be positioned on the gage to make a substantially frictionless connection therewith, and means carried on said roller assembly for leveling the instrument and the gage.

9. In a precision instrument for setting gaging fingers on a measurement testing gage, a pair of members relatively axially movably related and having cooperating measurement defining surfaces thereon, first means operatively connected to one of said members to move the same independently of the other of said members and adjust the spacing between said measurement surfaces on said pair of members, and roller means carried on said instrument for mounting said instrument on a measurement testing gage, and means for adjusting the position of said roller means relative to said instrument to eliminate any tendency for relative movement between the instrument and the gage.

10. In a gage setting instrument the improvement of a pair of relatively axially movable members related in axially aligned and spaced opposition, first rotary drive means threadedly connected to one of said members to move the same in its axial direction to any one of a plurality of setting positions, second rotary drive means connected to the other of said members to move the same in its axial direction selectively toward or away from said one member, means associated with each of said pair of axially movable members for eliminating error caused by imperfections in the threaded connections associated therewith, said last named means including an arm on each of said axially movable members, and a track for each of said arms to move in, said tracks having opposed spaced walls which angularly displace said associated arms during axial movement of the associated axially movable members to compensate for imperfections in the threads of the associated axially movable members, indicia on said rotary drive means collectively adapted to visually indicate the spacing between said pair of members, and means yieldably engageable with said rotatable drive means to minimize backlash therein.

11. A sizing fixture for setting the adjustment of gaging instruments comprising a frame, a coarse and a fine adjusting device carried on the frame, said devices having aligned members slidably connected to the frame and movable toward and away from each other, the distance between said aligned members being adjustable and used to set the adjustment of gaging instruments, separate rotatable members on the coarse and on the fine adjusting devices threadedly cooperating with the respective aligned members for axially moving said associated aligned members during rotation thereof, a calibrated scale on the coarse and on the fine adjusting device for indicating the respective positions of the aligned member associated therewith, the sum of the combined scale settings being equal to the distance between the aligned members, and means on one of said devices for locking said associated rotatable member in position to retain a setting thereof, said locking means including a pivotal arm carried on the frame, said arm having a bifurcated end formed with spaced unequal size portions, and a notch for receiving said bifurcated end formed in the associated rotatable member, said notch having opposed walls spaced less far apart than the outside dimension of the bifurcated end portion, the smaller of said unequal size end portions yielding to admit said arm end into the notch.

12. A measuring instrument comprising a frame having spaced supports connected by a bridge member, cooperating male and female threaded members mounted on each of said spaced supports, the male threaded members on each of said support being in axial alignment for movement toward or away from each other during rotational movement of the associated female members, said aligned male members having measurement defining surfaces positioned thereon in opposed relationship, a first arm connected to one of said male members and extending therefrom, a groove in said bridge member slidably receiving said first arm, said groove being defined by opposed spaced surfaces which engage said arm during movement thereof and which are positionally adjustable in said bridge member for angularly displacing the associated male member to provide predetermined accurate setting positions for the associated measurement defining surface and to thereby compensate for imperfections in the threads on said male member, means for visually indicating the position of the associated measurement defining surface, said means including a flexible tape with a scale thereon, said tape being windable on to or off of the associated female member during rotation thereof, and indicator means positioned adjacent to said tape for visually indicating the position of the associated measurement defining surface on said tape scale.

13. The measuring instrument defined in claim 12 wherein means are provided to limit the range of movement in both directions of one of said female members, said means including a pivotal latch member carried on the associated support and a stud carried on said female member, said stud engaging said latch in predetermined positions thereof to cam the latch into engagement with the female member and thereby prevent further movement in the same direction.

14. The measuring instrument defined in claim 12 wherein means are provided to limit the range of movement in both directions of one of said female members, said means including a pair of mating gears one of which is connected to said female member and both of which have projecting members which engage each other in preselected positions thereof.

15. A measuring instrument comprising a frame having spaced supports connected by a bridge member, cooperating male and female threaded members mounted on each of said spaced supports, the male threaded members on each of said supports being in axial alignment for movement toward or away from each other during rotational movement of the associated female members, said aligned male members having measurement defining surfaces positioned thereon in opposed relationship, a first arm connected to one of said male members and extending therefrom, a second arm connected to said other male member and extending therefrom, a groove in said bridge member for slidably receiving each of said first and second arms, said groove having opposed spaced surfaces which are positionally adjustable in the bridge member to angularly adjust the positions of the arms and associated male members to compensate for error in the positions of the arms and associated male members to thereby also compensate for error in the positions of the associated measurement defining surfaces caused by imperfections in the threads on said male members, means associated with each of said female members providing visual indication of the position of said associated measurement defining surface, the sum of said visual indicating means being proportional to the distance between said measurement defining surfaces, one of said last named means including a flexible tape with a scale thereon, said tape being windable onto or off of the associated female member, and indicator means positioned adjacent to said tape scale for visually indicating the position of the associated measurement defining surface on said tape scale.

16. A sizing fixture for setting the adjustment of gaging instruments comprising a frame, an adjusting device carried by said frame, said device having an axially movable member slidably connected to the frame and movable toward and away from a selected point on the fixture for changing the distance thereto, a rotatable member carried by said device in cooperative threaded engagement with said axially movable member, the sliding connection between said axially movable member and said frame including means for angularly rotating said axially movable member to compensate for imperfections in the threaded engagement between said axially movable member and the rotatable member, a calibrated scale on said device responsive to movement of the rotatable member and indicating the position of the axially movable member with respect thereto, and fixture mounting means carried by said frame for mounting the fixture in operative position on a gaging instrument, said mounting means including a roller assembly having roller means which make a rolling connection with the gaging instrument.

References Cited in the file of this patent

UNITED STATES PATENTS

| | | |
|---|---|---|
| 1,005,883 | Challet | Oct. 17, 1911 |
| 1,431,583 | Johansson | Oct. 10, 1922 |
| 1,940,475 | Witchger et al. | Dec. 19, 1933 |
| 2,348,712 | Dahlerup | May 16, 1944 |
| 2,445,402 | Malmberg | July 20, 1948 |
| 2,467,499 | Sachtleber | Apr. 19, 1949 |
| 2,516,956 | Carlton | Aug. 1, 1950 |
| 2,612,697 | Mathson | Oct. 7, 1952 |
| 2,639,510 | Laserson | May 26, 1953 |

FOREIGN PATENTS

| | | |
|---|---|---|
| 241,026 | Switzerland | June 1, 1946 |

UNITED STATES PATENT OFFICE
CERTIFICATE OF CORRECTION

Patent No. 3,002,284            October 3, 1961

Joseph Sunnen

It is hereby certified that error appears in the above numbered patent requiring correction and that the said Letters Patent should read as corrected below.

Column 7, line 12, for "onther" read -- another --; column 9, line 74, and column 10, line 3, for "usually", each occurrence, read -- visually --.

Signed and sealed this 1st day of May 1962.

(SEAL)
Attest:

ERNEST W. SWIDER            DAVID L. LADD Attesting Officer            Commissioner of Patents